Jan. 18, 1955  W. B. LANDGRAF  2,700,143
PLASTIC INSULATED SCREW BASE
Filed Feb. 7, 1951
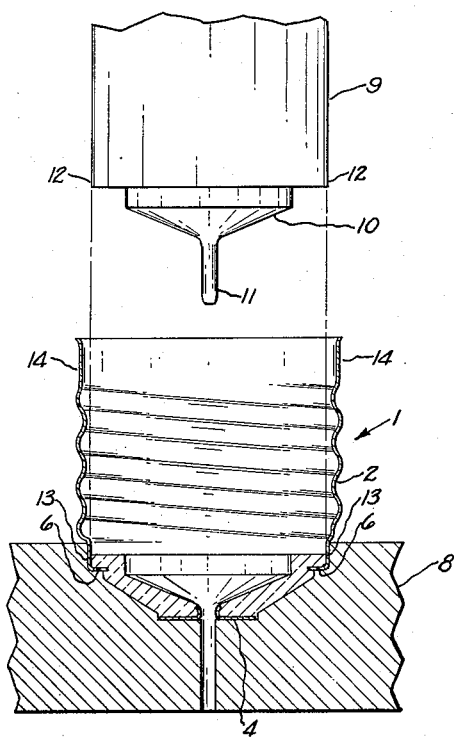
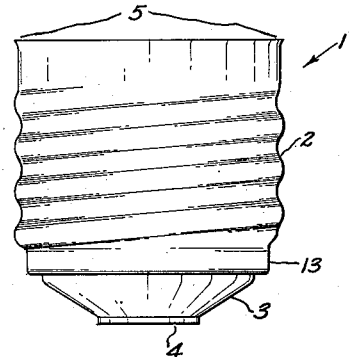
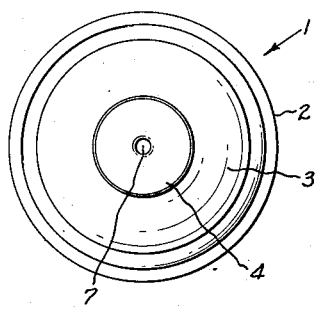
Inventor:
William B. Landgraf,
by *Vernet C. Kauffman*
His Attorney.

United States Patent Office 2,700,143
Patented Jan. 18, 1955

2,700,143

PLASTIC INSULATED SCREW BASE

William B. Landgraf, Cleveland Heights, Ohio, assignor to General Electric Company, a corporation of New York; patent dedicated to the Public insofar as it relates to lamps and lamp parts to the extent stated in document recorded in the United States Patent Office, January 4, 1954, liber U-238, page 394

Application February 7, 1951, Serial No. 209,829

1 Claim. (Cl. 339—146)

This invention relates generally to Edison or screw type bases for electric lamps and similar devices, and more particularly to such bases wherein the web or insulating body holding the end contact is made of a plastic material molded at a high pressure.

The principal object of my invention is to provide an improved screw base construction for electric lamps which facilitates molding of the web from a plastic material at a high pressure.

Another object of my invention is to provide an improved screw type base for electric lamps wherein the configuration of the shell of the base facilitates the use of a direct acting force or plunger for molding a plastic insulating material in order to form a web closing the outer end of the base.

The invention is specifically concerned with providing a solution to certain problems that arise when it is desired to substitute a molded plastic for glass as the material constituting the web of an electric lamp base. Examples of the plastic materials with which the invention is concerned are phenol, urea, and melamine formaldehydes and alkyd type plastics. Such plastics are of the thermosetting type, that is, they are formed under heat and pressure simultaneously applied, and a permanent condensation or polymerization occurs such that the shape of the molded body cannot further be modified by subsequent applications of heat or pressure. In the lamp making industry up to the present time, the insulating webs of lamp bases have generally been made of glass. However, it is becoming increasingly desirable to replace glass by thermosetting plastics as the material of the web, because it permits utilizing aluminum instead of brass for the shell of the base. The use of aluminum is made possible by the fact that the molding temperature for these plastics is well below the annealing range of aluminum, whereas that of glass is above. In addition, lamp bases having the insulating web made of a plastic material have certain advantages such as the elimination of rattling due to loose pieces of glass in the base, the elimination of scrap loss resulting from broken insulators, and in general a better appearance.

When the insulating web is made of glass, the molding pressures used are very low so that there is little tendency to force excess glass up the side of the shell in between the force or plunger used for the operation, and the threads of the base. With the thermosetting plastic materials, high molding pressures are required, and, since the plastic material flows readily under heat and pressure and can penetrate very small spaces, the problem of holding flash on the sides of the shell to a low point is a much more difficult one. In addition, the problem is accentuated when the shell is threaded, as it must necessarily be for the type of bases considered herein. It would be possible of course to use an inside molding plunger or force which is threaded, but this would necessitate screwing the force into the shell during the molding operation and unscrewing to remove it. Such a solution is hardly practical because the cost of using threaded forces or plungers would be prohibitive.

In addition, the use of a threaded force does not solve a further problem arising from the fact that the diameter of the collar at the open end of the base, that is at the end which is cemented to the bulb of a lamp, is smaller than the maximum inside diameter of the shell across the crest of the threads. Furthermore, certain screw-in type bases require a web or a disposition of the insulation at the outer end which is not uniform across all sections. For instance, the bases utilized with three-way or three-light lamps have a conical depression and a hole in the web at a point off the center of the base in order to permit threading of the lead-in wire to an intermediate contact ring on the outer side of the web. In other words, the inside configuration of the plastic web cannot be considered a surface of revolution so that it cannot be molded by screwing a force or plunger into the shell.

In accordance with the invention, a solution to the problems described above is found in making at the outer end of the metal shell of a screw type base, a straight cylindrical portion of relatively short length and having a diameter less than the root diameter of the threaded portion of the shell. Such a construction allows molding of the plastic with a cylindrical force and greatly simplifies the molding operation by eliminating the need for a threaded force which must be screwed in.

Other features of the invention are illustrated in the accompanying drawing and will be described, along with their ensuing advantages, in the description of a preferred embodiment which now follows. The features which are believed to be novel will be more patricularly pointed out in the appended claims.

In the drawing:

Fig. 1 is a side elevation view of a screw type base for an electric lamp having its insulating web made of a thermosetting plastic and embodying a preferred form of the invention.

Fig. 2 is a lower end or bottom plan view of the same lamp base.

Fig. 3 contains a sectional view of the base located in a suitable die or mold employed in forming the plastic web, and a force or plunger positioned above the base such as is used during the molding operation.

Referring to Fig. 1, the base 1 comprises a threaded metal shell 2, an insulating web 3 and an end contact 4. The shell is drawn from light gauge metal and the threads subsequently formed, generally by a rolling operation. As was mentioned earlier, one of the advantages of utilizing a thermosetting plastic material for the web is that it allows aluminum to be used for the metal of the shell. The shell is slightly outwardly flared at its inner end, as indicated at 5, in order to permit cementing the neck of the bulb to the base at that point for constituting an electric lamp.

As may be seen more readily in Figs. 2 and 3, the outer end of the shell is closed by the web 3 which is generally conical in form. The web is locked to the shell by reason of the fact that the outer annular ring or inturned flange 6 of the shell is imbedded in the plastic. The end contact or eyelet 4 is locked to the web by the outwardly flanged shoulders or burred edges of the central hole 7 which are imbedded in the plastic material.

As illustrated in Fig. 3, the web is molded in situ by locating the shell 2 in a mold 8 having a cavity cut into its upper surface and shaped to conform to the desired outer configuration of the web. The eyelet 4 is dropped into the central recess in the cavity, and thereafter a measured quantity of the plastic molding material, either as a granular mass or as a preform, is dropped into the bottom of the shell. The plastic material is pressed to the desired configuration by means of a force 9 which moves down into the interior of the shell. The lower face of the force is provided with a projecting conical portion 10 and a pin 11 which give the desired inner configuration to the web. The pin 11 is addition keeps the hole 7 in the eyelet clear of plastic in order that one of the lead-in wires from the bulb may be threaded through it and soldered to the eyelet.

As was mentioned earlier, the plastic material condenses or polymerizes as a result of its subjection to heat and pressure. The heat is imparted to the plastic material from the mold 8 which, in the case of a phenol formaldehyde plastic, may be maintained at a temperature of approximately 350° F. The pressure which must be exerted on the plastic material by the force 9 is in the range of a few thousand pounds per square inch. With such pressures, it is essential that the shoulders 12 of the force achieve a close fit with the inner periphery of the shell, as otherwise a quantity of plastic material will escape on the inside of the threads. In addition to the ensuing wastage of the plastic, the molding would be unsatisfactory due to the relief of pressure resulting from the loss of the plastic. In accordance with the invention, the necessary close fit is achieved by providing at the outer end of the shell a straight cylindrical portion 13 which has a diameter slightly under the root diameter of the threaded portion of the shell. Such a construction makes it possible for the force 9 to move directly down into the shell and permits the shoulders 12 to achieve a close fit with the portion 13. As a result, the plastic material is compressed into the web and practically none of it escapes so that undesirable flash is kept to a minimum.

The invention thus eliminates the need for using a threaded force as would be required with the prior art type of bases wherein the threads continue all the way to the outer end of the shell. Also the difficulties which would be encountered in attempting to screw a threaded force past the inner collar 14 of the shell are avoided, and the production process is greatly simplified.

While a specific embodiment has been shown and described, it will of course be understood that various modifications may be made without departing from the invention. Thus whereas the straight cylindrical portion has been illustrated as being only a fraction of the pitch of one thread in length, it may be made longer or shorter as required. It is evident that the length or extension of the straight cylindrical portion will depend upon the inward extension of the plastic web when molded in place in the lower end of the shell. In general however the straight cylindrical portion may be made as long as the pitch of one complete thread of the shell and the lamp will still be held securely in a conventional screw type socket. The appended claims are therefore intended to cover any such modifications coming within the true spirit and scope of the invention.

What I claim as new and desire to secure by Letters Patent of the United States is:

A screw type base for an electric lamp comprising a thin-walled generally cylindrical threaded metal shell, one end of said shell terminating in a straight cylindrical portion having an inside diameter slightly smaller than the inner root diameter of the threads of the shell and having a length less than the pitch of said threads, and a web of thermosetting organic plastic material molded to the inner wall of the extreme end of said cylindrical portion and extending thereinto a distance less than the length of said cylindrical portion.

References Cited in the file of this patent

UNITED STATES PATENTS

| | | |
|---|---|---|
| 2,033,643 | Neill | Mar. 10, 1936 |
| 2,185,981 | Haller | Jan. 2, 1940 |
| 2,459,543 | Schmerheim | Jan. 18, 1949 |
| 2,504,586 | Reinker | Apr. 18, 1950 |

FOREIGN PATENTS

| | | |
|---|---|---|
| 797,345 | France | Apr. 24, 1936 |